US009871449B2

(12) United States Patent
Hirukawa et al.

(10) Patent No.: US 9,871,449 B2
(45) Date of Patent: Jan. 16, 2018

(54) MULTIPHASE DC/DC CONVERTER WITH COUPLING INDUCTORS

(71) Applicant: MURATA MANUFACTURING CO., LTD., Kyoto-fu (JP)

(72) Inventors: Atsuo Hirukawa, Kyoto-fu (JP); Ko Yamanaga, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 14/724,194

(22) Filed: May 28, 2015

(65) Prior Publication Data

US 2016/0254747 A1 Sep. 1, 2016

(30) Foreign Application Priority Data

Jun. 6, 2014 (JP) ................................ 2014-117904

(51) Int. Cl.
*G05F 1/00* (2006.01)
*H02M 3/158* (2006.01)

(52) U.S. Cl.
CPC ................................ *H02M 3/1584* (2013.01)

(58) Field of Classification Search
CPC .................................................... H02M 3/158
USPC ........................................ 323/268, 271, 272
See application file for complete search history.

(56) References Cited

U.S. PATENT DOCUMENTS 6,362,986 B1 3/2002 Schultz et al.
6,839,252 B2 * 1/2005 Tai ..................... H02M 3/1584 323/272
6,965,219 B2 * 11/2005 Brooks ............... H02M 3/1584 323/272
8,716,991 B1 5/2014 Ikriannikov
9,082,543 B2 * 7/2015 Ohtomo .............. H01L 23/5227
2003/0214272 A1 * 11/2003 Nishimaki ............ H02M 3/158 323/225
2007/0001658 A1 * 1/2007 Nguyen .............. H02M 3/1584 323/290

(Continued)

FOREIGN PATENT DOCUMENTS

JP 2004-221458 A 8/2004
JP 2012-029549 A 2/2012
JP 2012-134201 A 7/2012

OTHER PUBLICATIONS

Notification of the Second Office Action issued by the State Intellectual Property Office of the People's Republic of China dated Nov. 16, 2017, which corresponds to Chinese Patent Application No. 201510303135.X and is related to U.S. Appl. No. 14/724,194.

(Continued)

*Primary Examiner* — Alex Torres-Rivera
(74) *Attorney, Agent, or Firm* — Studebaker & Brackett PC

(57) ABSTRACT

A two-phase DC/DC converter includes, as an inductor array, a pair of inductors to which a DC input voltage is alternately applied with a phase difference of about 180 degrees through switching control of switching devices. A duty ratio is substantially in a range from 5% to 40%, and a coupling factor between the inductors is substantially in a range from −0.4 to −0.1. With this configuration, ripple current in the inductors can be made to be smaller than in the case in which there is no coupling between the inductors even when the duty ratio considerably varies.

7 Claims, 14 Drawing Sheets

(56) References Cited

U.S. PATENT DOCUMENTS

2009/0066307 A1* 3/2009 Osterhout ........... H02M 3/1584 323/283
2010/0013307 A1* 1/2010 Heineman ................ G06F 1/26 307/33
2015/0355360 A1* 12/2015 Miyashita ............... H02J 7/025 320/108

OTHER PUBLICATIONS

Li et al.; Application of the coupling Inductor in the interlock parallel Boost-converter; Journal of Changchun University of Technology (Nature Science Edition); Dec. 2007; pp. 382-386; vol. 28, No. 4.
Rong et al.; Effects of coupling inductance on interlocks parallel converter's ouput characteristics; Journal of Liaoning Technology University (Nature Science); May 2008; pp. 172-174; Supplement, vol. 27.

* cited by examiner

ON

SW1
OFF iL1
ON

SW2
OFF iL2 i0

Vout
Vout=α × Vin

MULTIPHASE DC/DC CONVERTER WITH COUPLING INDUCTORS

CROSS REFERENCE TO RELATED APPLICATIONS

This application claims benefit of priority to Japanese Patent Application No. 2014-117904 filed Jun. 6, 2014, the entire content of which is incorporated herein by reference.

TECHNICAL FIELD

The present disclosure relates to a multiphase DC/DC converter having a configuration that includes an inductor array.

BACKGROUND

Existing examples of multiphase DC/DC converters of this type include a two-phase DC/DC converter 10 disclosed in U.S. Pat. No. 6,362,986, illustrated in FIG. 1.

In the two-phase DC/DC converter 10, input voltages Va and Vb are switched between by two switching devices 12 so that they are alternately converted into an output voltage Vc. A duty ratio, which is a ratio of the output voltage Vc to the input voltage Va or Vb is set to about 50% or between about 5% to 90%. The output voltage Vc is smoothed by two inductors, which are formed of windings 14A and 14B as an inductor array, and a capacitor 17. The windings 14A and 14B are wound about rungs 16A and 16B of a core 16, and the rungs 16A and 16B, together with risers 16C and 16D, form the core 16 which is substantially shaped like a square. When an input voltage Va is applied to the windings 14A and 14B through switching performed by the two switching devices 12 with a phase difference of about 180 degrees, magnetic flux 18A collides with magnetic flux 18C. When an input voltage Vb is applied to the windings 14A and 14B, magnetic flux 18B collides with magnetic flux 18D. Hence, when the input voltage Va or Vb is applied to the windings 14A and 14B, a magnetic flux flow in the core 16 is decreased, and negative coupling is generated between inductors formed by the windings 14A and 14B.

A magnetic inductance formed as a result of magnetic flux interlinking with the core 16 is set to be higher than or equal to about three times a leakage inductance formed as a result of magnetic flux leaking from the core 16. In other words, a coupling factor k between inductors formed by the windings 14A and 14B is substantially set to −0.75 or less (k≤−0.75). In the case where the duty ratio is about 50%, as shown by characteristics line 19 represented by a solid line, in the graph illustrated in FIG. 2, the smaller the coupling factor k with respect to this negative value (k≤−0.75) and, hence, the stronger the negative coupling, the smaller the ripple current in the inductors, whereby the DC voltage conversion efficiency of the two-phase DC/DC converter 10 increases. Note that the horizontal axis of the graph represents the coupling factor k and the vertical axis represents ripple current (A) in the inductors.

SUMMARY

In the multiphase DC/DC converter disclosed in U.S. Pat. No. 6,362,986, the smaller in the negative direction the coupling factor k between the inductors, the smaller the ripple current when the duty ratio is about 50%, as described above. However, as illustrated by a characteristics line 20 represented by a dotted line in the graph, in the case where the duty ratio is about 25%, the ripple current increases when the coupling factor k becomes too small in the negative direction. In other words, there is a problem in that in the existing multiphase DC/DC converter described above, when the duty ratio considerably deviates from about 50%, the ripple current increases in the case where the coupling factor k is about −0.75 or less.

Accordingly, it is an object of the present disclosure to solve the problems described above.

According to preferred embodiments of the present disclosure, a multiphase DC/DC converter includes an inductor array, and the inductor array includes a pair of inductors to which a DC input voltage is alternately applied with a phase difference of about 180 degrees through switching control of switching devices. The duty ratio of a DC output voltage to a DC input voltage is substantially within a range from 5% to 40%, and a coupling factor between the inductors is substantially in a range of greater than −0.4 and −0.1 or less.

According to this configuration, when the duty ratio is substantially between 5% and 40% and the coupling factor is substantially between −0.4 and −0.1, ripple current in the inductors can be made to be smaller than in the case in which there is no coupling between the inductors even when the duty ratio considerably varies.

According to preferred embodiments of the present disclosure, the inductor array may be formed of any even number of the inductors.

According to this configuration, also in the case in which the inductor array is formed of any even number of the inductors, when the duty ratio is substantially between 5% and 40% and the coupling factor is substantially between −0.4 and −0.1, between each pair of the inductors to which a DC input voltage is alternately applied with a phase difference of 180 degrees, ripple current in the inductors can be made to be smaller than in the case in which there is no coupling between the inductors even when the duty ratio considerably varies.

According to the present disclosure, a multiphase DC/DC converter can be provided in which ripple current in the inductors can be made to be smaller than in the case in which there is no coupling between the inductors even when the duty ratio considerably varies.

Other features, elements, characteristics and advantages of the present disclosure will become more apparent from the following detailed description of preferred embodiments of the present disclosure with reference to the attached drawings.

DETAILED DESCRIPTION

Embodiments of a multiphase DC/DC converter of the present disclosure will be described.

Figure 1:
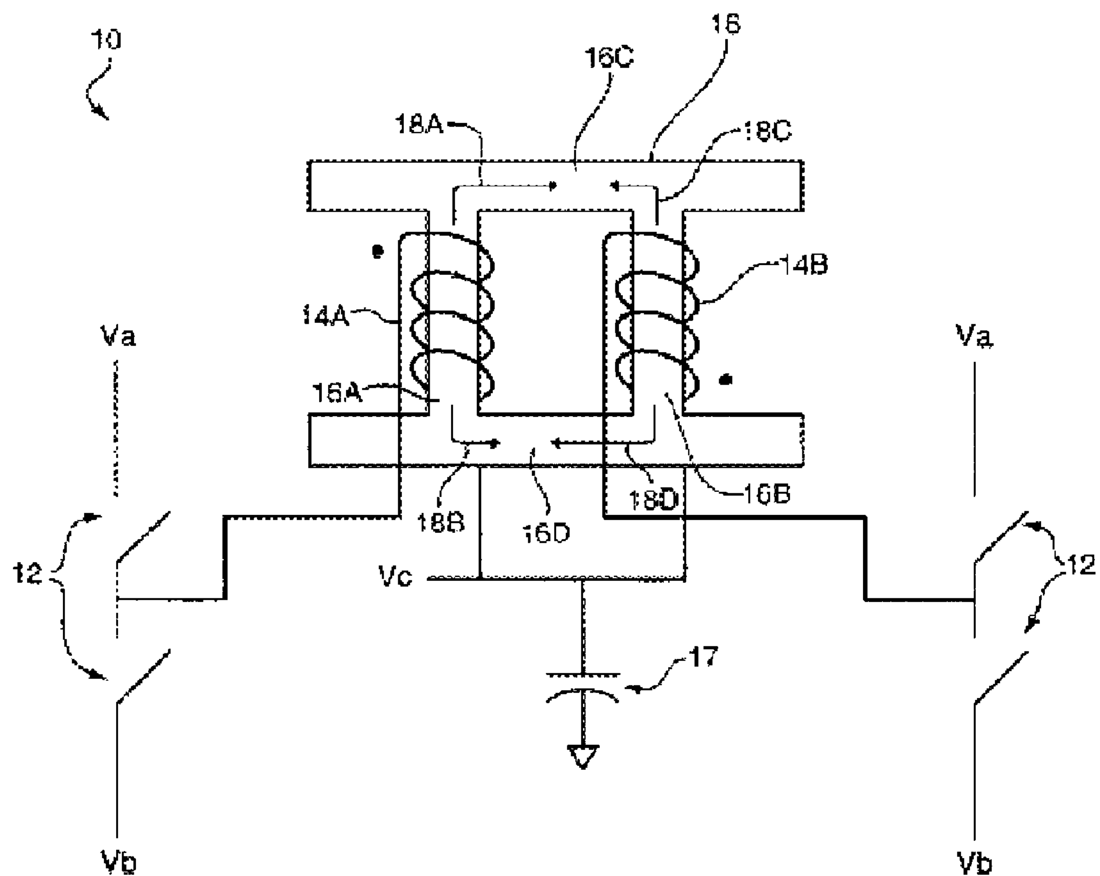
FIG. 1 is a circuit diagram illustrating the configuration of an existing two-phase DC/DC converter.
Figure 2:
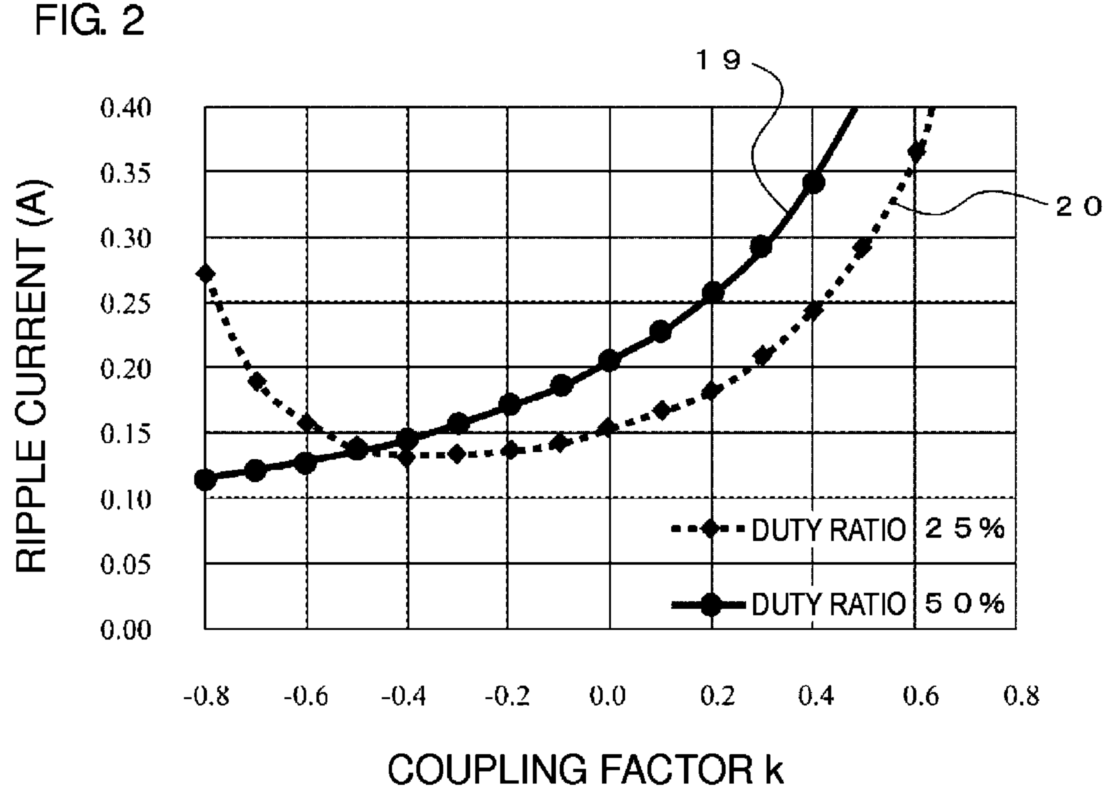
FIG. 2 is a graph illustrating the relationship between a coupling factor between inductors in an inductor array and ripple current in the inductors, in the existing two-phase DC/DC converter.
Figure 3:
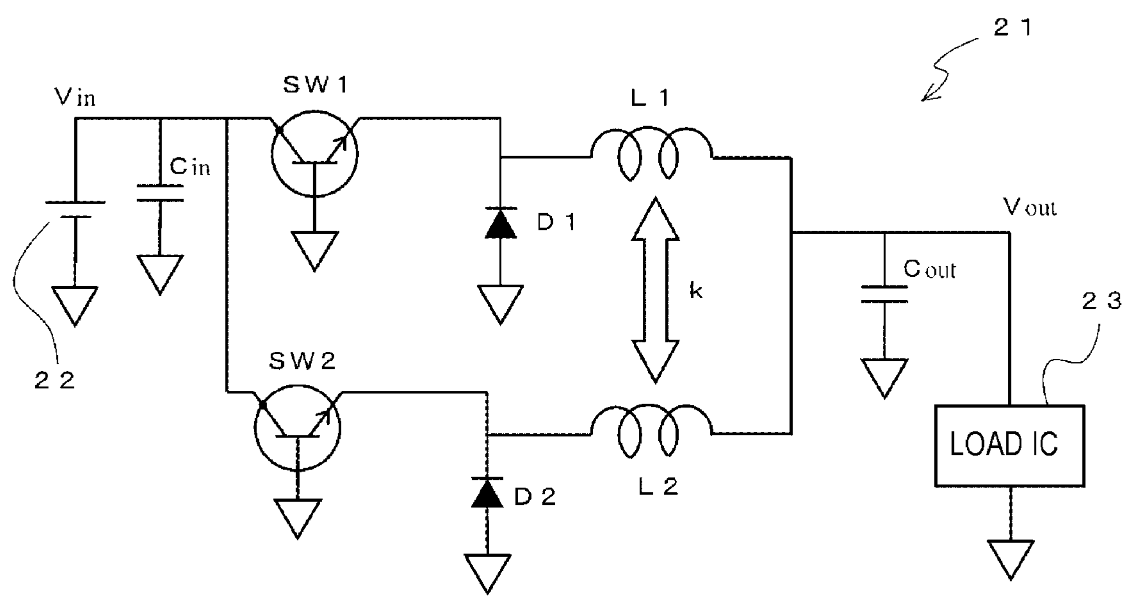
FIG. 3 is a circuit diagram illustrating the configuration of a two-phase DC/DC converter according to an embodiment of the present disclosure.

FIG. 3 is a circuit diagram illustrating a two-phase DC/DC converter 21 according to an embodiment of the present disclosure.

The two-phase DC/DC converter 21 includes, in an input stage, a constant-voltage capacitor Cin that makes a DC input voltage that is input from a DC voltage supply 22 be constant, and includes, in a stage subsequent to the constant-voltage capacitor Cin, a first DC/DC converter unit and a second DC/DC converter unit connected in parallel with the first DC/DC converter unit. The first DC/DC converter unit is formed of a switching device SW1 formed of a transistor, a free-wheeling diode D1, an inductor L1, and a smoothing capacitor Cout. The second DC/DC converter unit is formed of a switching device SW2 formed of a transistor, a free-wheeling diode D2, an inductor L2, and the smoothing capacitor Cout. The inductor L1 and the smoothing capacitor Cout, and the inductor L2 and the smoothing capacitor Cout smooth a DC output voltage Vout. The inductor L1 and the inductor L2, which form an inductor array having a coupling factor k, are connected to other circuit devices configured as an IC.

Figures 4A, 4B, 4C, 4D, 4E, 4F:
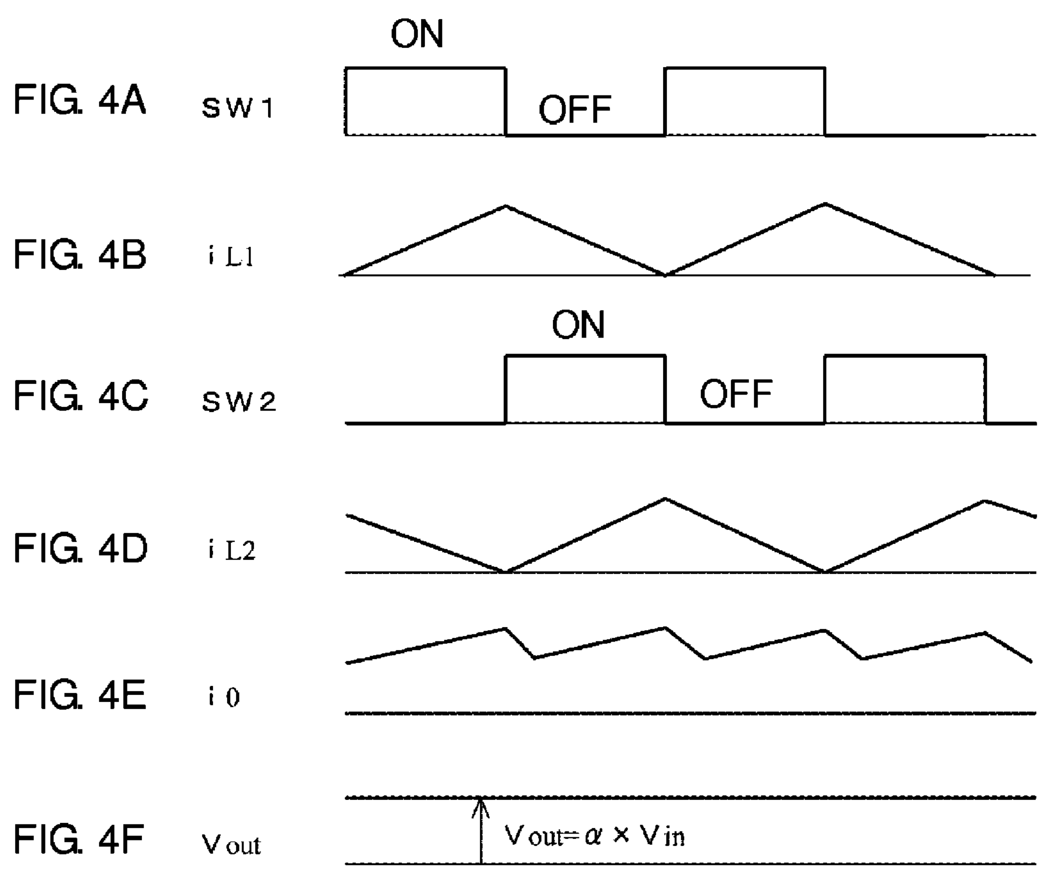
FIGS. 4A to 4F illustrate timing charts of circuit portions of a two-phase DC/DC converter according to an embodiment.

The switching devices SW1 and SW2 are subjected to switching control of a PWM controller (not illustrated) with a phase difference of about 180 degrees between the respective switching operations as illustrated by timing charts of FIGS. 4A and 4C, whereby DC input voltages Vin shaped like substantially rectangular waves having a phase difference of about 180 degrees are applied to inductors L1 and L2. As illustrated by FIG. 4B, a gradually increasing current iL1 flows through the inductor L1 when the switching device SW1 is on, and a gradually decreasing current iL1 flows through the inductor L1 due to the free-wheeling diode D1 when the switching device SW1 is off. Similarly, as illustrated by FIG. 4D, a gradually increasing current iL2 flows through the inductor L2 when the switching device SW2 is on, and a gradually decreasing current iL2 flows through the inductor L2 due to the free-wheeling diode D2 when the switching device SW2 is off. Hence, a current io, which is the sum of the current iL1 and the current iL2, illustrated in FIG. 4E flows as an output current, whereby the smoothed DC voltage Vout illustrated in FIG. 4F is applied to a load IC 23. Here, when a duty ratio is denoted by $\alpha$, $Vout=\alpha\times Vin$.

FIG. 5 to FIG. 13 are graphs illustrating the simulation results of the relationship between the coupling factor k between the inductor L1 and the inductor L2 in the inductance array described above and ripple current in the inductors for the cases in which the duty ratio is changed from about 5% to about 45% in increments of about 5%. Note that the simulation was performed only for the inductor array in a state in which the inductor array was taken out of the circuit described above, and influence from other circuit devices was not taken into consideration. In each graph, the horizontal axis represents the coupling factor k and the vertical axis represents the ripple current (A) in the inductors L1 and L2. The characteristics lines 31, 32, 33, 34, 35, 36, 37, 38, and 39 represented by solid lines respectively show the relationships between the coupling factor k between the inductor L1 and the inductor L2 in the inductance array described above and ripple current in the inductors for the cases in which the duty ratios are about 5%, 10%, 15%, 20%, 25%, 30%, 35%, 40%, and 45%. The characteristics lines 41 to represented by dotted lines show ripple current in the inductors for the cases in which k is about zero under these duty ratios.

Figure 5:
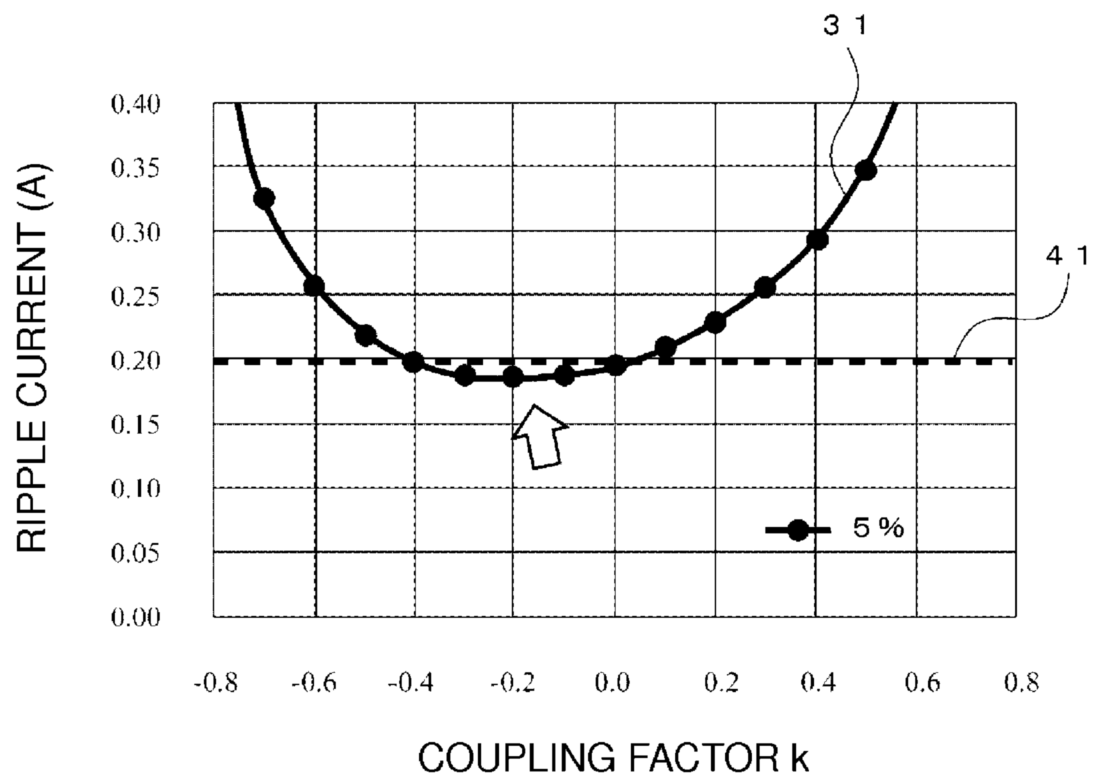
FIG. 5 is a graph illustrating the relationship between a coupling factor between inductors and ripple current in the inductors for the case in which the duty ratio is about 5%, in an inductor array forming part of the two-phase DC/DC converter according to an embodiment.

In the graph illustrated in FIG. 5 corresponding to the case in which the duty ratio is about 5%, in a range of the coupling factor k indicated by an arrow where the characteristics line 31 is below the characteristics line 41, the ripple current represented by the characteristics line 31 is smaller than the ripple current represented by the characteristics line 41 corresponding to the case in which the coupling factor k is about zero. This range of the coupling factor k is substantially $-0.4<k<0.0$. In the graph illustrated in FIG. 6 corresponding to the case in which the duty ratio is about 10%, in a range of the coupling factor k indicated by an arrow where the characteristics line 32 is below the characteristics line 42, the ripple current represented by the characteristics line 32 is smaller than the ripple current represented by the characteristics line 42 corresponding to the case in which the coupling factor k is about zero. This range of the coupling factor k is also substantially $-0.4<k<0.0$. In the graph illustrated in FIG. 7 corresponding to the case in which the duty ratio is about 15%, in a range of the coupling factor k indicated by an arrow where the characteristics line 33 is below the characteristics line 43, the ripple current represented by the characteristics line 33 is smaller than the ripple current represented by the characteristics line 43 corresponding to the case in which the coupling factor k is about zero. This range of the coupling factor k is substantially $-0.5<k<0.0$. In the graph illustrated in FIG. 8 corresponding to the case in which the duty ratio is about 20%, in a range of the coupling factor k indicated by an arrow where the characteristics line 34 is below the characteristics line 44, the ripple current represented by the characteristics line 34 is smaller than the ripple current represented by the characteristics line 44 corresponding to the case in which the coupling factor k is substantially zero. This range of the coupling factor k is substantially $-0.55<k<0.0$.

Figure 9:
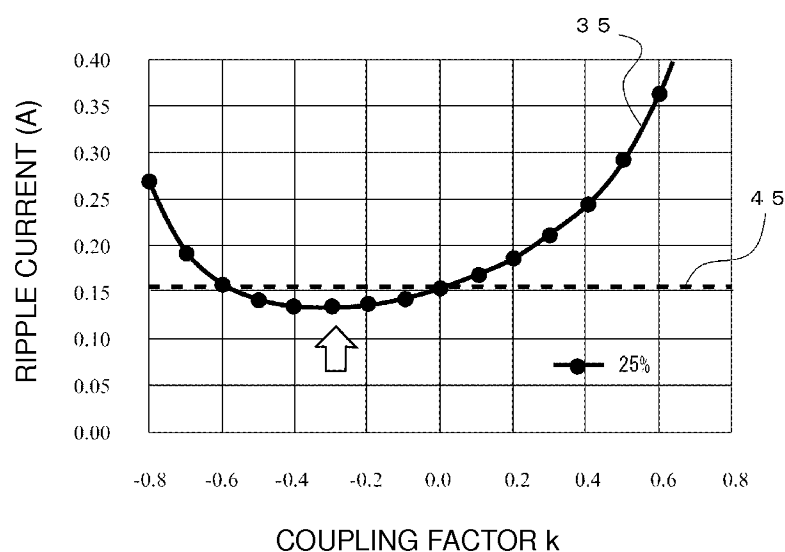
FIG. 9 is a graph illustrating the relationship between a coupling factor between inductors and ripple current in the inductors for the case in which the duty ratio is about 25%, in an inductor array forming part of the two-phase DC/DC converter according to an embodiment.
Figure 10:
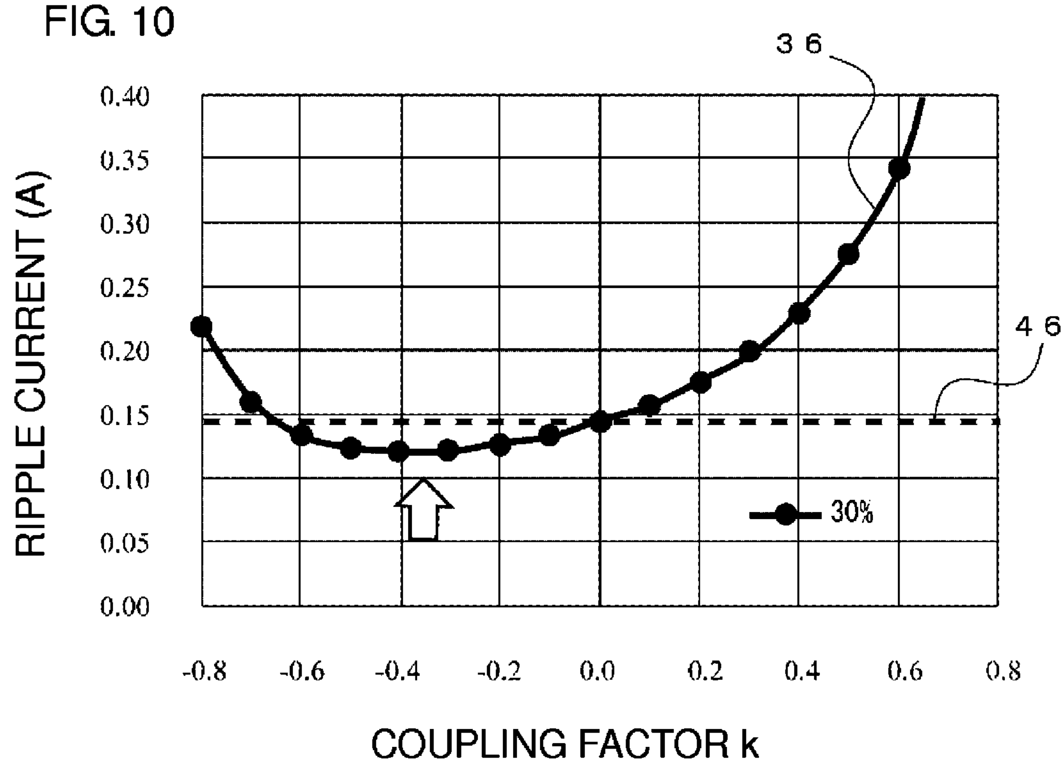
FIG. 10 is a graph illustrating the relationship between a coupling factor between inductors and ripple current in the inductors for the case in which the duty ratio is about 30%, in an inductor array forming part of the two-phase DC/DC converter according to an embodiment.
Figure 11:
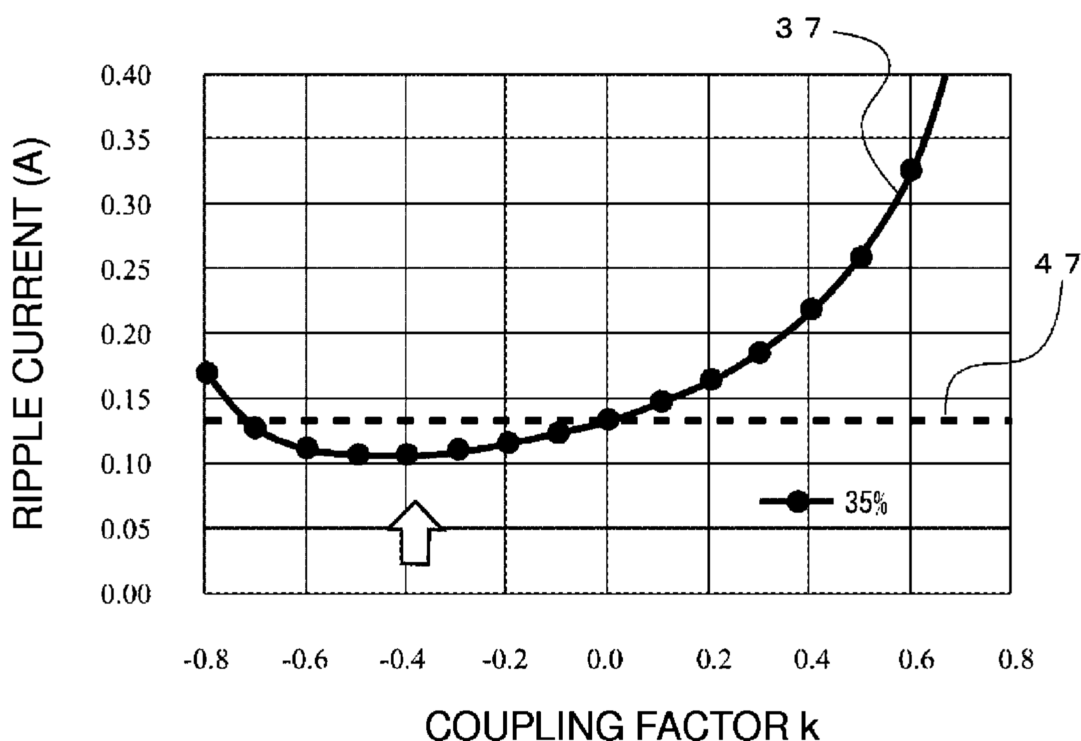
FIG. 11 is a graph illustrating the relationship between a coupling factor between inductors and ripple current in the inductors for the case in which the duty ratio is about 35%, in an inductor array forming part of the two-phase DC/DC converter according to an embodiment.
Figure 12:
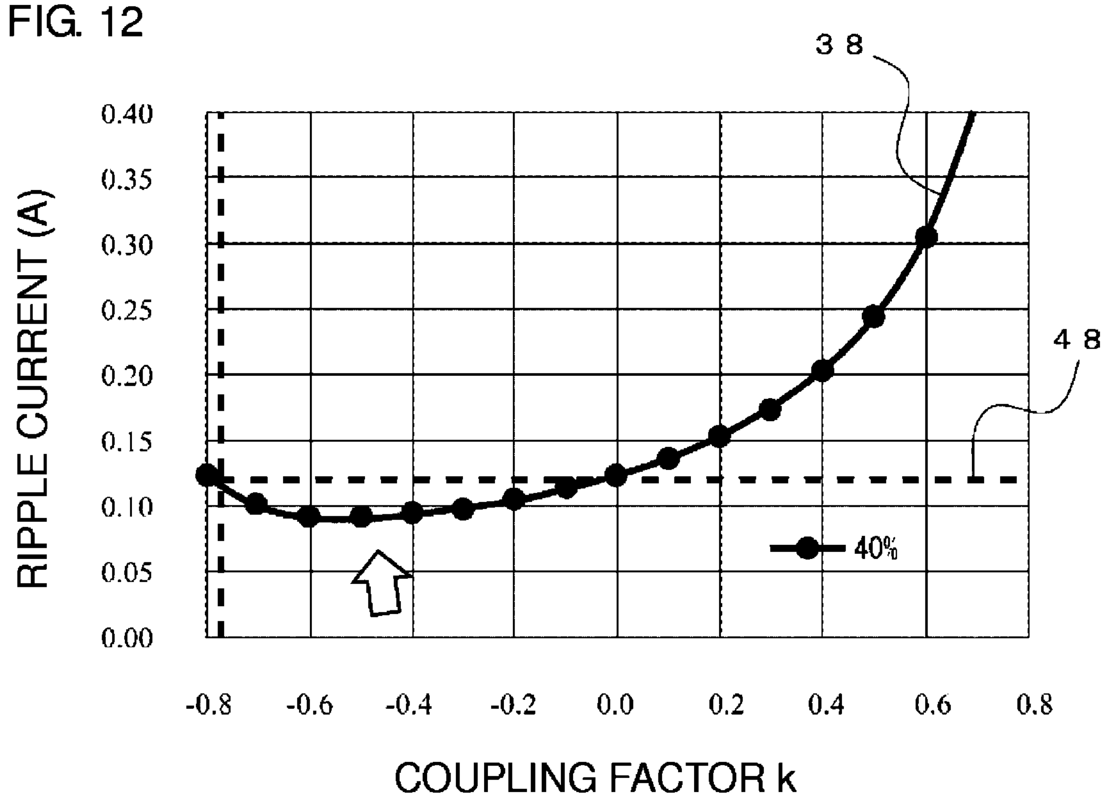
FIG. 12 is a graph illustrating the relationship between a coupling factor between inductors and ripple current in the inductors for the case in which the duty ratio is about 40%, in an inductor array forming part of the two-phase DC/DC converter according to an embodiment.

In the graph illustrated in FIG. 9 corresponding to the case in which the duty ratio is about 25%, in a range of the coupling factor k indicated by an arrow where the characteristics line 35 is below the characteristics line 45, the ripple current represented by the characteristics line 35 is smaller than the ripple current represented by the characteristics line 45 corresponding to the case in which the coupling factor k is about zero. This range of the coupling factor k is substantially $-0.6<k<0.0$. In the graph illustrated in FIG. 10 corresponding to the case in which the duty ratio is about 30%, in a range of the coupling factor k indicated by an arrow where the characteristics line 36 is below the characteristics line 46, the ripple current represented by the characteristics line 36 is smaller than the ripple current represented by the characteristics line 46 corresponding to the case in which the coupling factor k is about zero. This range of the coupling factor k is substantially $-0.65<k<0.0$. In the graph illustrated in FIG. 11 corresponding to the case in which the duty ratio is about 35%, in a range of the coupling factor k indicated by an arrow where the characteristics line 37 is below the characteristics line 47, the ripple current represented by the characteristics line 37 is smaller than the ripple current represented by the characteristics line 47 corresponding to the case in which the coupling factor k is about zero. This range of the coupling factor k is substantially $-0.7<k<0.0$. In the graph illustrated in FIG. 12 corresponding to the case in which the duty ratio is about 40%, in a range of the coupling factor k indicated by an arrow where the characteristics line 38 is below the characteristics line 48, the ripple current represented by the characteristics line 38 is smaller than the ripple current represented by the characteristics line 48 corresponding to the case in which the coupling factor k is about zero. This range of the coupling factor k is substantially $-0.75<k<0.0$.

In the graph illustrated in FIG. 13 corresponding to the case in which the duty ratio is about 45%, in a range of the coupling factor k indicated by an arrow where the characteristics line 39 is below the characteristics line 49, the ripple current represented by the characteristics line 39 is smaller than the ripple current represented by the characteristics line 49 corresponding to the case in which the coupling factor k is about zero. However, although the characteristics line 48 crosses the characteristics line 38 at a point at which the coupling factor k is about −0.75 in the graph illustrated in FIG. 12 corresponding to the case in which the duty ratio is about 40%, the ripple current corresponding to the case in which the coupling factor k is about −0.75 is smaller than that corresponding to the case in which the coupling factor k is about zero, in the graph illustrated in FIG. 13 corresponding to the case in which the duty ratio is about 45%. Hence, a range in which the ripple current represented by the characteristics line 39 becomes smaller than that corresponding to the case in which the coupling factor k is about zero cannot be determined.

Figure 6:
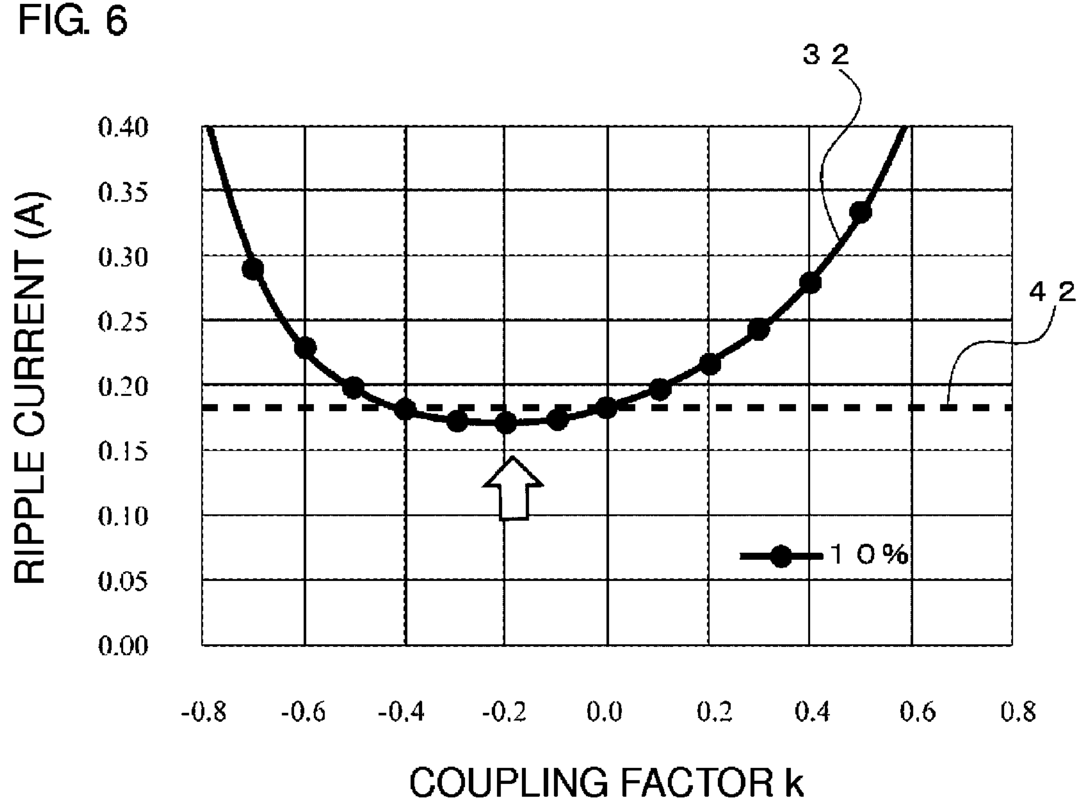
FIG. 6 is a graph illustrating the relationship between a coupling factor between inductors and ripple current in the inductors for the case in which the duty ratio is about 10%, in an inductor array forming part of the two-phase DC/DC converter according to an embodiment.
Figure 7:
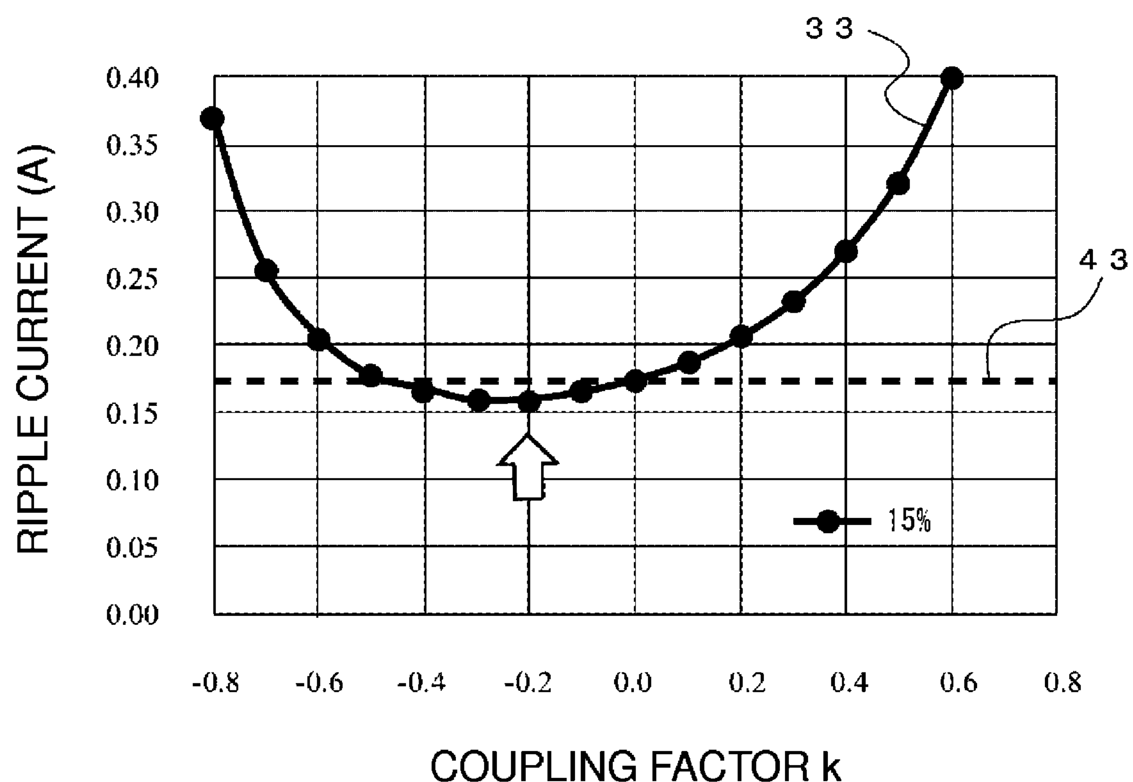
FIG. 7 is a graph illustrating the relationship between a coupling factor between inductors and ripple current in the inductors for the case in which the duty ratio is about 15%, in an inductor array forming part of the two-phase DC/DC converter according to an embodiment.
Figure 8:
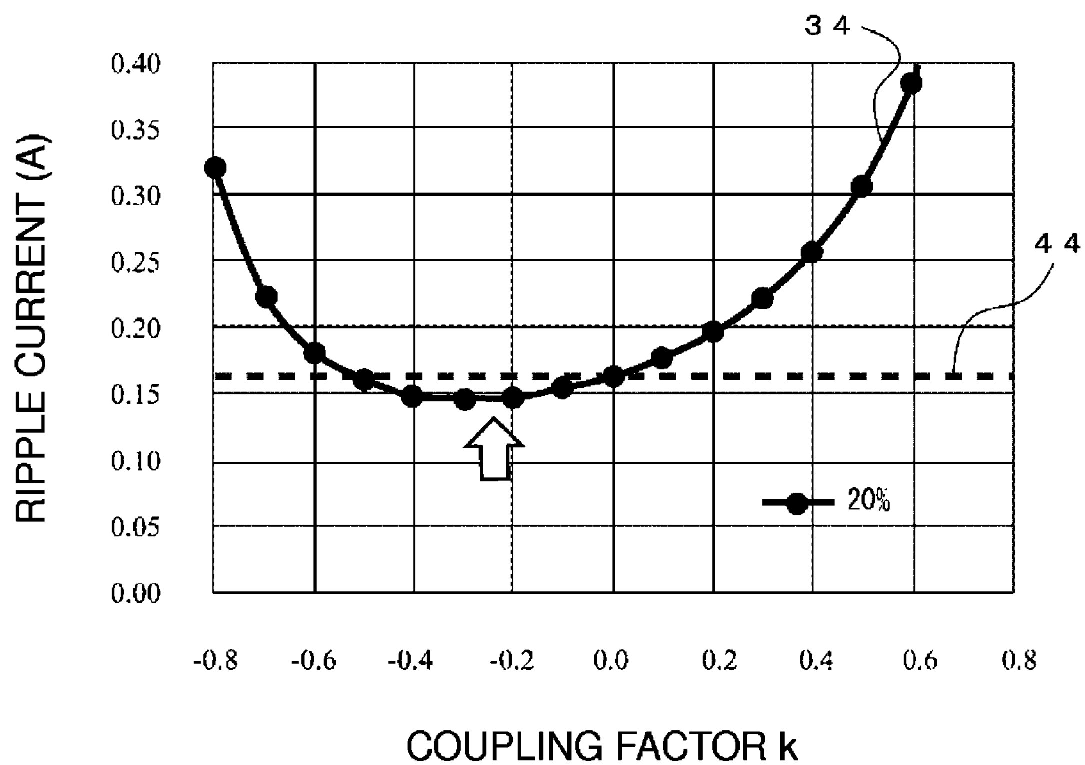
FIG. 8 is a graph illustrating the relationship between a coupling factor between inductors and ripple current in the inductors for the case in which the duty ratio is about 20%, in an inductor array forming part of the two-phase DC/DC converter according to an embodiment.
Figure 13:
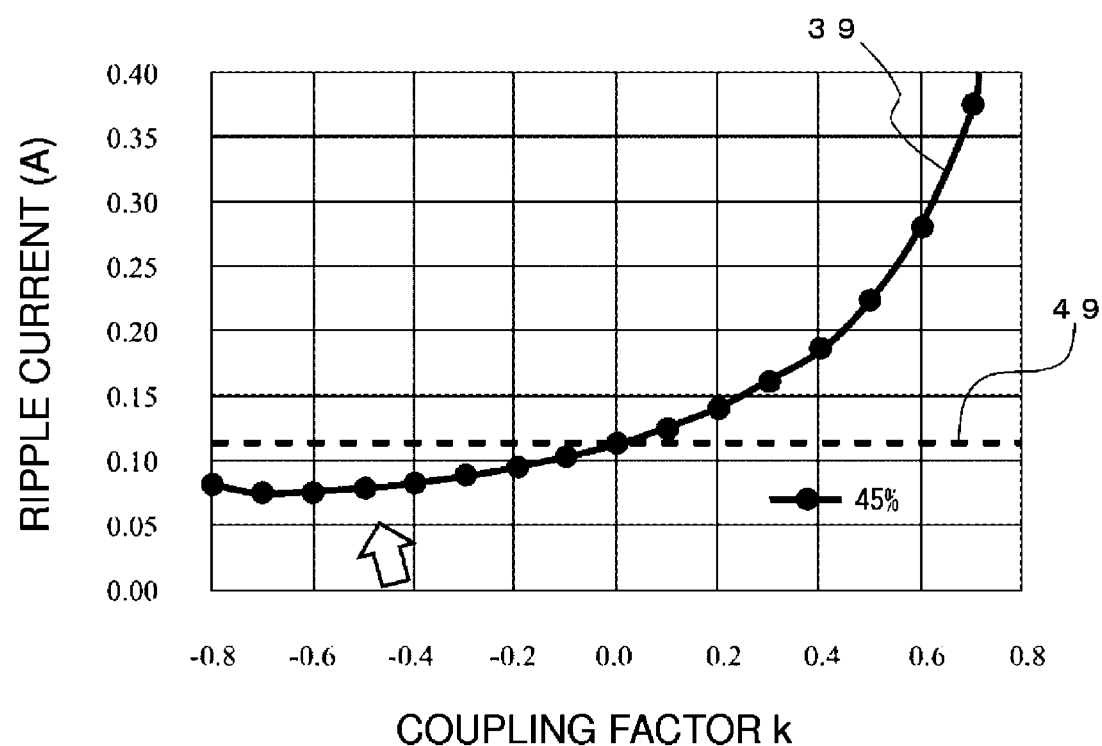
FIG. 13 is a graph illustrating the relationship between a coupling factor between inductors and ripple current in the inductors for the case in which the duty ratio is about 45%, in an inductor array forming part of the two-phase DC/DC converter according to an embodiment.

Hence, by excluding the case in which the duty ratio is about 45% as illustrated in FIG. 13, when the coupling factor k is above about −0.4, which is the lower limit of the narrowest range substantially $-0.4<k<0.0$ illustrated in FIG. 5 and FIG. 6, and the coupling factor k is smaller than or equal to about −0.1, which is slightly below about 0.0, in the range of the duty ratio substantially between 5% and 40% illustrated in FIG. 5 to FIG. 12, ripple current in the inductors can be suppressed to below the ripple current corresponding to the case in which the coupling factor k is about zero.

Figure 14:
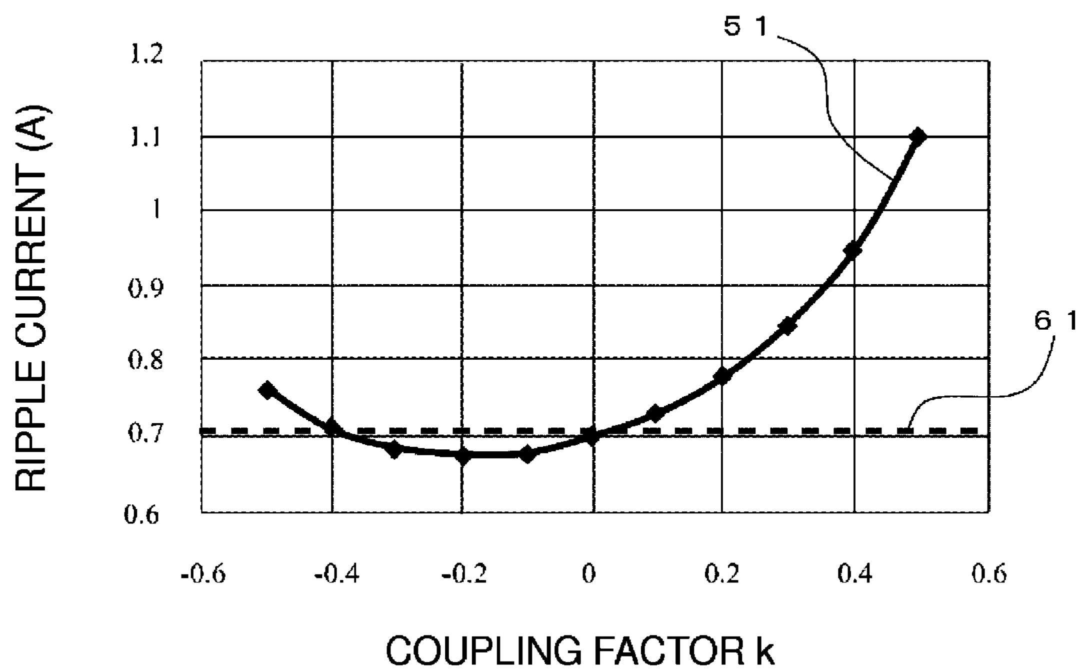
FIG. 14 is a graph illustrating the relationship between a coupling factor between inductors and ripple current in the inductors for the case in which the duty ratio is about 25%, in an inductor array forming part of the two-phase DC/DC converter according to an embodiment, taking into consideration influence from circuit devices.

FIG. 14 illustrates the simulation results of the relationship between the coupling factor k between the inductors L1 and L2 and ripple current flowing through the inductors, taking into consideration not only the inductor array but also all of the circuit devices illustrated in the circuit of FIG. 3, unlike the above-described simulation. In this simulation, the DC input voltage Vin is about 4 V, the DC output voltage Vout is about 1 V, and the duty ratio is about 25% (=(¼)×100%), and the coupling factor k was substantially changed from −0.5 to 0.5 in increments of about 0.1 V. Also in the graph illustrated in FIG. 14, the horizontal axis represents the coupling factor k and the vertical axis represents the ripple current (A). A characteristics line 51 represented by a solid line shows the relationship between the coupling factor k between the inductors L1 and L2 and ripple current in the inductors when the duty ratio is about 25%. A characteristics line 61 represented by a dotted line shows the ripple current corresponding to the case in which the duty ratio is about 25% and the coupling factor k is substantially zero.

As shown by the graphs based on the simulation results, it was confirmed that ripple current in the inductors can be made to be smaller than ripple current corresponding to the case in which the coupling factor k is substantially zero, in a range of the coupling factor k substantially between −0.4 and −0.1 described above.

In other words, according to the two-phase DC/DC converter 21 of the present embodiment that includes the pair of inductors L1 and L2 as an inductor array to which the DC input voltage Vin is alternately applied with a phase difference of about 180 degrees through switching control of the switching devices SW1 and SW2, where the duty ratio is substantially between 5% and 40% and the coupling factor k is substantially between −0.4 and −0.1, ripple current in the inductors L1 and L2 can be made to be smaller than in the case in which there is no coupling between the inductors L1 and L2, even when the duty ratio considerably varies.

In the embodiment described above, it was assumed that the multiphase DC/DC converter of the present disclosure is a two-phase DC/DC converter, and the case in which the inductor array formed of the two inductors L1 and L2 is provided has been described. However, the inductor array may be configured to include any even number of inductors, where the DC input voltage Vin is alternately applied to each pair of the inductors with a phase difference of about 180 degrees.

Also in the case in which the inductor array is configured to include any even number of inductors as described above, when the duty ratio is between about 5% and 40% and the coupling factor between each pair of inductors to which the DC input voltage Vin is alternately applied with a phase difference of about 180 degrees is between about −0.4 and −0.1, ripple current in the inductors can be made to be smaller than in the case in which there is no coupling between the inductors even when the duty ratio considerably varies.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multiphase DC/DC converter comprising:

an inductor array;

the inductor array including a pair of inductors to which a DC input voltage is alternately applied with a phase difference of about 180 degrees through switching control of a pair of switching devices;

when one of the pair of the switching devices is on, a gradually increasing current flows through one of the pair of the inductors and a gradually decreasing current flows through the other of the pair of the inductors;

when the other of the pair of the switching devices is on, a gradually decreasing current flows through the one of the pair of the inductors and a gradually increasing current flows through the other of the pair of the inductors;

a duty ratio of a DC output voltage to the DC input voltage at or about 20%;

a coupling factor between the inductor pair is −0.1 to −0.5;

within the range of the coupling factor from −0.1 to −0.3, ripple current in the pair of the inductors decreases; and within the range of the coupling factor from −0.3 to −0.5, the ripple current in the pair of the inductors increases.

2. The multiphase DC/DC converter according to claim 1, wherein the inductor array is formed of any even number of the inductors.

3. The multiphase DC/DC converter according to claim 1, wherein a duty ratio of a DC output voltage to the DC input voltage is 25%.

4. A multiphase DC/DC converter comprising:

an inductor array;

the inductor array including a pair of inductors to which a DC input voltage is alternately applied with a phase difference of about 180 degrees through switching control of a pair of switching devices;

when one of the pair of the switching devices is on, a gradually increasing current flows through one of the pair of the inductors and a gradually decreasing current flows through the other of the pair of the inductors;

when the other of the pair of the switching devices is on, a gradually decreasing current flows through the one of the pair of the inductors and a gradually increasing current flows through the other of the pair of the inductors;

a duty ratio of a DC output voltage to the DC input voltage at or about 25%;

wherein a coupling factor between the inductor pair is from −0.1 to −0.6;

within the range of the coupling factor from −0.1 to −0.4, ripple current in the pair of the inductors decreases; and within the range of the coupling factor from −0.4 to −0.6, the ripple current in the pair of the inductors increases.

5. The multiphase DC/DC converter according to claim 4, wherein a duty ratio of a DC output voltage to the DC input voltage is 25%.

6. A multiphase DC/DC converter comprising:

an inductor array;

the inductor array including a pair of inductors to which a DC input voltage is alternately applied with a phase difference of about 180 degrees through switching control of a pair of switching devices;

when one of the pair of the switching devices is on, a gradually increasing current flows through one of the pair of the inductors and a gradually decreasing current flows through the other of the pair of the inductors;

when the other of the pair of the switching devices is on, a gradually decreasing current flows through the one of the pair of the inductors and a gradually increasing current flows through the other of the pair of the inductors;

a duty ratio of a DC output voltage to the DC input voltage at or about 30%;

a coupling factor between the inductor pair is from −0.1 to −0.65;

within a range of the coupling factor from −0.1 to −0.4, ripple current in the pair of the inductors decreases; and within the a range of the coupling factor from −0.4 to −0.65, the ripple current in the pair of the inductors increases.

7. The multiphase DC/DC converter according to claim 6, wherein the duty ratio of the DC output voltage to the DC input voltage is 30%.

* * * * *